United States Patent [19]

Underwood et al.

[11] Patent Number: 5,737,464
[45] Date of Patent: Apr. 7, 1998

[54] MONOLITHIC OPTICAL FIBER COUPLER INCLUDING SLEEVE WITH FLEXIBLE FLAP

[75] Inventors: David T. Underwood, N. Richland Hills; Mike de Jong, Fort Worth, both of Tex.

[73] Assignee: Siecor Corporation, Hickory, N.C.

[21] Appl. No.: 521,700

[22] Filed: Aug. 31, 1995

[51] Int. Cl.⁶ .................................................. G02B 6/36
[52] U.S. Cl. ........................... 385/72; 385/58; 385/60; 385/70
[58] Field of Search .............................. 385/56, 58, 69, 385/66, 60, 77, 78, 70, 88, 92

[56] References Cited

U.S. PATENT DOCUMENTS

| | | | |
|---|---|---|---|
| 4,936,662 | 6/1990 | Griffin | 385/77 |
| 5,073,042 | 12/1991 | Mulholland et al. | 385/69 |
| 5,136,672 | 8/1992 | Mulholland et al. | 385/53 |
| 5,233,674 | 8/1993 | Vladic | 385/56 |
| 5,317,663 | 5/1994 | Beard et al. | 385/70 |
| 5,348,487 | 9/1994 | Marazzi et al. | 385/78 |
| 5,359,688 | 10/1994 | Underwood | 385/70 |
| 5,542,015 | 7/1996 | Hultermans | 385/60 |

Primary Examiner—Rodney B. Bovernick
Assistant Examiner—Hemang Sanghavi
Attorney, Agent, or Firm—Wesley T. Noah

[57] ABSTRACT

A coupler is provided for coupling standard optical fiber connectors of the type with a ferrule extending from a connector housing. The coupler has a monolithic ferrule sleeve that defines a passageway configured for receiving and operatively aligning the ferrules from the two connectors to be coupled. A first latch portion is spaced from and generally parallel with the ferrule sleeve. A midpoint of the first latch portion is connected to a midpoint of the ferrule sleeve. A second latch portion is similarly connected to the ferrule sleeve opposite the first latch portion. The first and second latch portions are configured for engaging the connector housings of the connectors to be coupled.

12 Claims, 4 Drawing Sheets

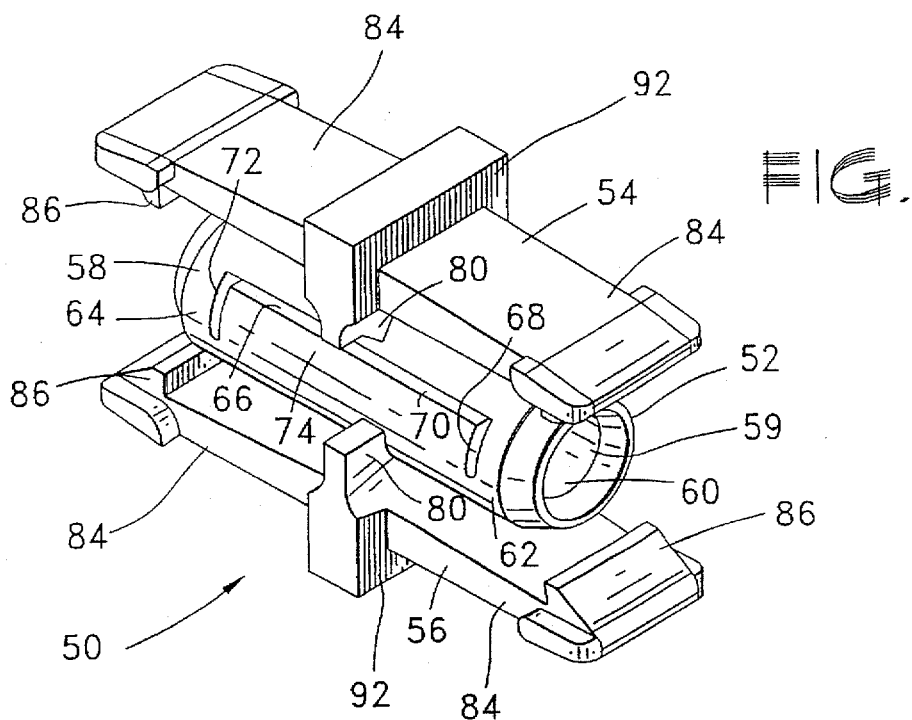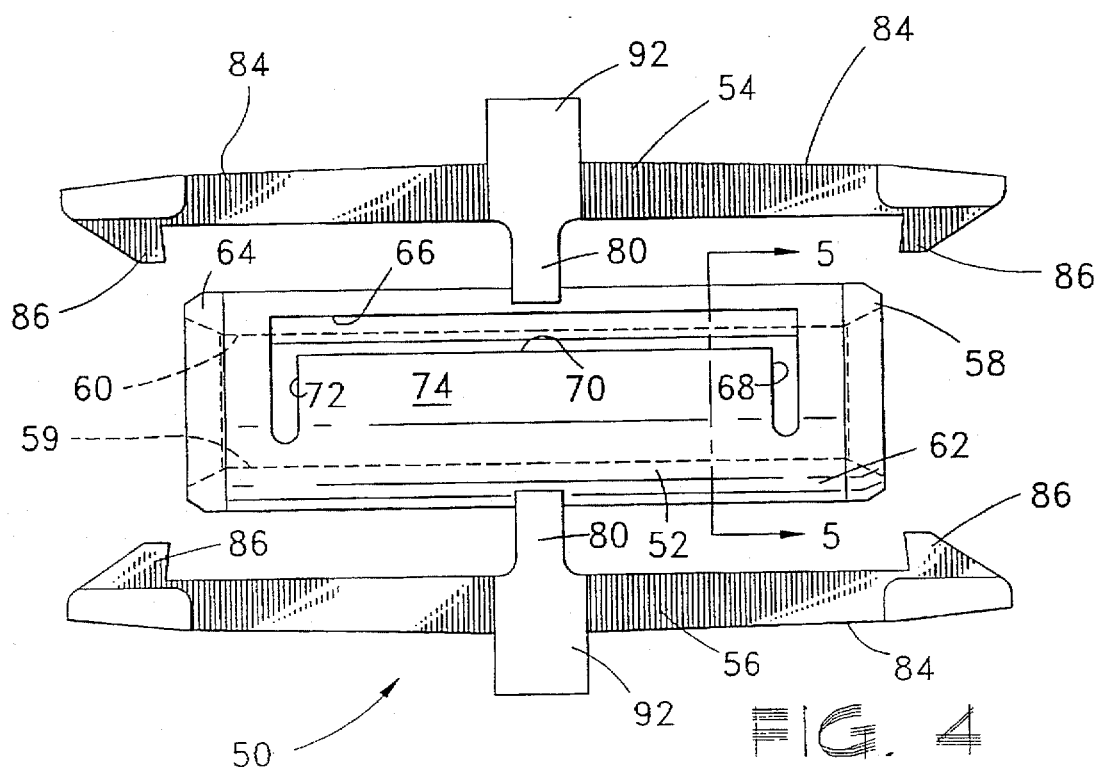

MONOLITHIC OPTICAL FIBER COUPLER INCLUDING SLEEVE WITH FLEXIBLE FLAP

TECHNICAL FIELD OF THE INVENTION

The present invention relates to an optical fiber coupler for coupling a pair of optical fiber connectors of the kind with a ferrule extending from a connector housing. In one aspect, the present invention relates to a monolithic coupler that positively engages the connector housings of a pair of conventional optical fiber connectors and operatively aligns the ferrules of the connectors.

BACKGROUND OF THE INVENTION

As is well known, a number of standard optical fiber connectors have been developed such as the SC, FC, and ST® compatible connectors that are dressed onto the end of an optical fiber cable. Such connectors generally have a connector housing with a ferrule extending therefrom that contains the end of the optical fiber. A coupler is used to couple two connectors and operatively align the optical fibers in the respective ferrules of the two connectors. By way of example, FIG. 1 is an exploded view of an improved SC coupler 10 subject of U.S. Pat. No. 5,359,688 to Undercod, co-inventor of the subject application. FIG. 2 illustrates an assembled SC coupler 10 of FIG. 1 with two SC connectors 12 positioned for insertion into coupler 10.

SC connector 12 generally has a ferrule 14 spring mounted in connector housing 16. Connector housing 16 is disposed in grip sleeve 18. Grip sleeve 18 slides relative to connector housing 16 and serves to disengage connector 12 from coupler 10 when pulled and facilitates engagement of connector 12 to coupler 10 when pushed.

A conventional SC coupler 12 generally has a ceramic ferrule sleeve 20 for receiving and aligning the ends of ferrules 14 of connectors 12. Ferrule sleeve 20 is received in two inner halves 22. Each inner half 22 has retaining sleeve 24 for retaining ferrule sleeve 20 and two cantilevered arms 26. Connector housing 16 is insertable between cantilevered arms 26 which have projections 28 for engaging catches 30 on the exterior of connector housings 16. Assembly of the conventional SC coupler 10 involves inserting ferrule sleeve 20 within the two retaining sleeves 24 of the two inner halves 22 and bonding the two inner halves 22 together inside two outer halves 32 that are also bonded together during assembly. The two outer halves 32 are sized to receive the ends of conventional SC connectors 12 including the ends of the grip sleeves 18. The outer halves 32 are also commonly provided with flanges to allow mounting of the coupler 10 to frames and the like. Thus, it can be seen that the conventional SC coupler 10 involves at a minimum five pieces to be manufactured and assembled: a ceramic ferrule sleeve, two inner halves, and two outer halves.

Aside from the number of pieces involved in manufacturing a conventional SC coupler, the conventional SC coupler also suffers from a design flaw. Specifically, when two SC connectors are inserted into engagement with the SC coupler the end faces of the two ferrules are forced against each other by the spring mounts of the ferrules. This spring force exerts a separation force on the two inner halves and over time the bond between the two inner halves imparted during manufacture of the SC coupler may fail. The Underwood '688 patent addresses this problem by adding two metal clips 34 to the two inner halves. While clips 34 help prevent the separation of the two inner halves, the assembly of such an improved SC coupler now involves assembly of two additional pieces with the five pieces of the conventional SC coupler.

Therefore a need exists for a coupler that is comprised of fewer pieces to allow ease of manufacture and assembly. Additionally, a need exists for such a coupler that is not subject to failure due to prolonged separation forces exerted by the ferrule spring mounts.

Another drawback of the conventional SC coupler is that they use expensive ceramic ferrule sleeves to achieve the required precise alignment of the ferrules of the connectors. A cost reduction could be achieved by molding the ferrule sleeve out of plastic, but a plastic ferrule sleeve would require a thicker wall to maintain the required preciseness of the ferrule sleeve, and the space available in the standard SC coupler would not accommodate a ferrule sleeve with a thicker wall.

Accordingly, a need exists for a coupler with a plastic ferrule sleeve to reduce cost over the conventional ceramic or metal ferrule sleeve. Furthermore, a need exists for such a coupler that incorporates a plastic ferrule sleeve within the standard dimensions of an SC coupler.

SUMMARY OF THE INVENTION

In one aspect of the present invention, a coupler is provided for connecting optical fiber connectors of the type with a ferrule extending from a housing. The coupler comprises a monolithic ferrule sleeve having an interior and an exterior. The interior is configured for receiving and axially aligning the ends of each of the ferrules in an end to end abutting relation at a point in the interior of the ferrule sleeve. The coupler further comprises a first latch portion that is spaced from and extends parallel with the ferrule sleeve. A midpoint of the first latch portion is connected to a midpoint of the exterior of the ferrule sleeve. The coupler also comprises a second latch portion that is spaced from and extends parallel with the ferrule sleeve. A midpoint of the second latch portion is connected to a midpoint of the exterior of the ferrule sleeve. The first and second latch portions are configured to be engageable with the connector housings of the optical fiber connectors.

A further aspect of the present invention comprises the coupler as discussed above wherein the ferrule sleeve defines at least one cut-out to create at least one flexible wall in the ferrule sleeve that bears against the ferrules when the ferrules are disposed in the ferrule sleeve.

The present invention provides a coupler that is not subject to failure caused by the separation forces exerted by the spring mounted ferrules in the connectors. The coupler of the present invention is also easier to assemble than the conventional five part coupler. Furthermore, the coupler of the present invention can be made entirely of plastic, including the ferrule sleeve, and still be constructed within the standard outer dimensions for a coupler. Such a construction eliminates the need to use costly ceramic or metal ferrule sleeves.

BRIEF DESCRIPTION OF THE DRAWINGS

FIG. 3 is a perspective view of the preferred embodiment of the coupler of the present invention;

FIG. 4 is a side view of the coupler of FIG. 3;

DETAILED DESCRIPTION

Figure 1:
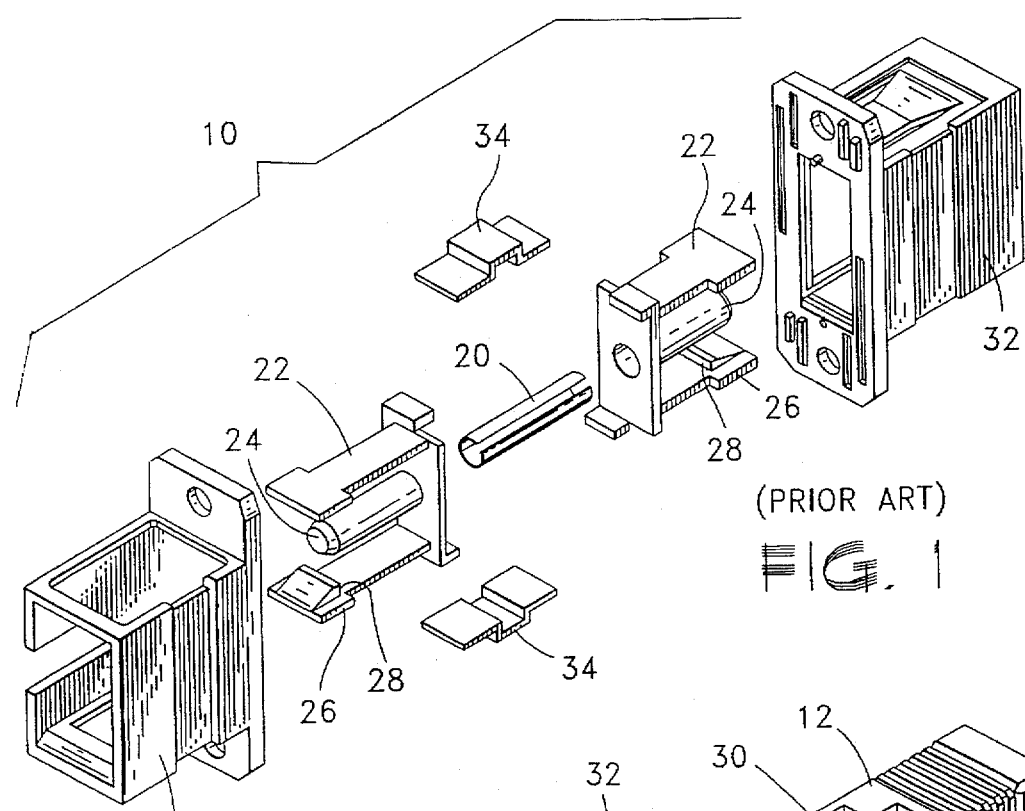
FIG. 1 is an exploded view of a prior art SC coupler.
Figure 2:
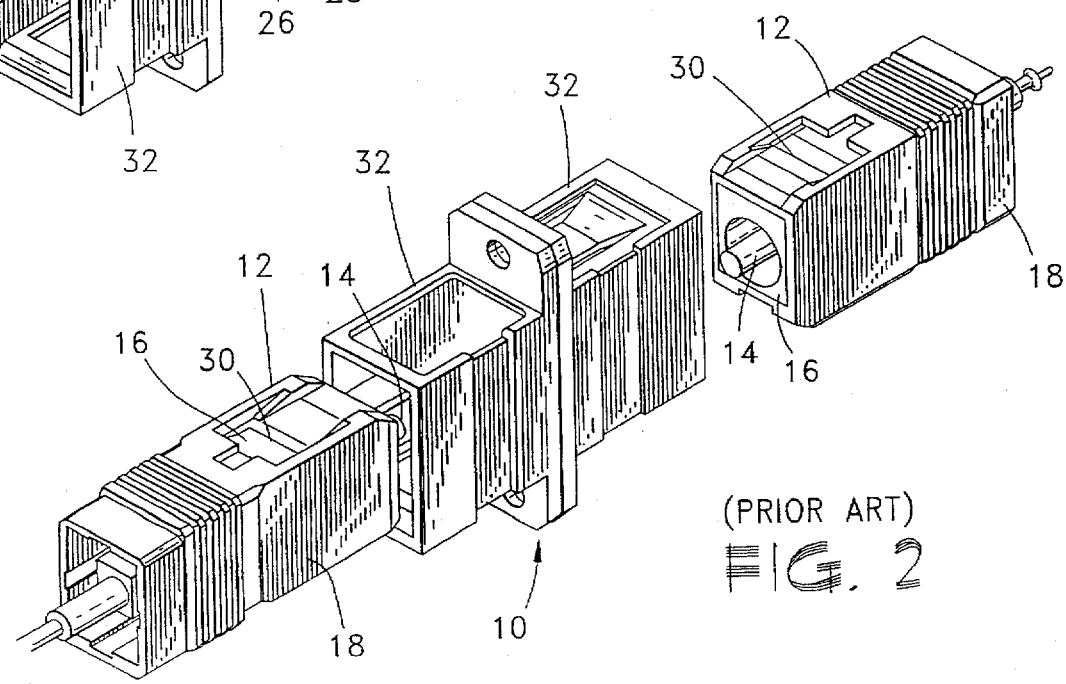
FIG. 2 is a perspective view of the coupler of FIG. 1 with two conventional SC connectors disposed for insertion into the coupler.
Figure 5:
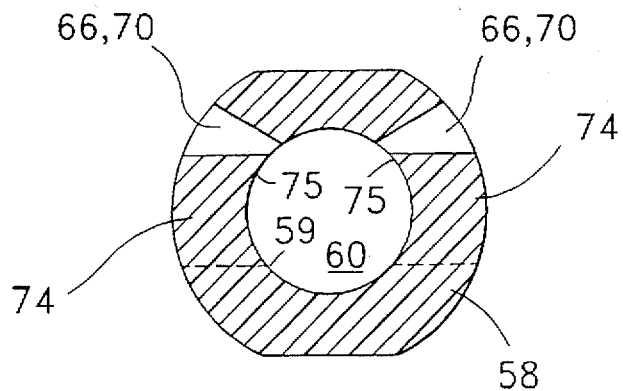
FIG. 5 is a cross-section along line 5—5 in FIG. 4.
Figure 6:
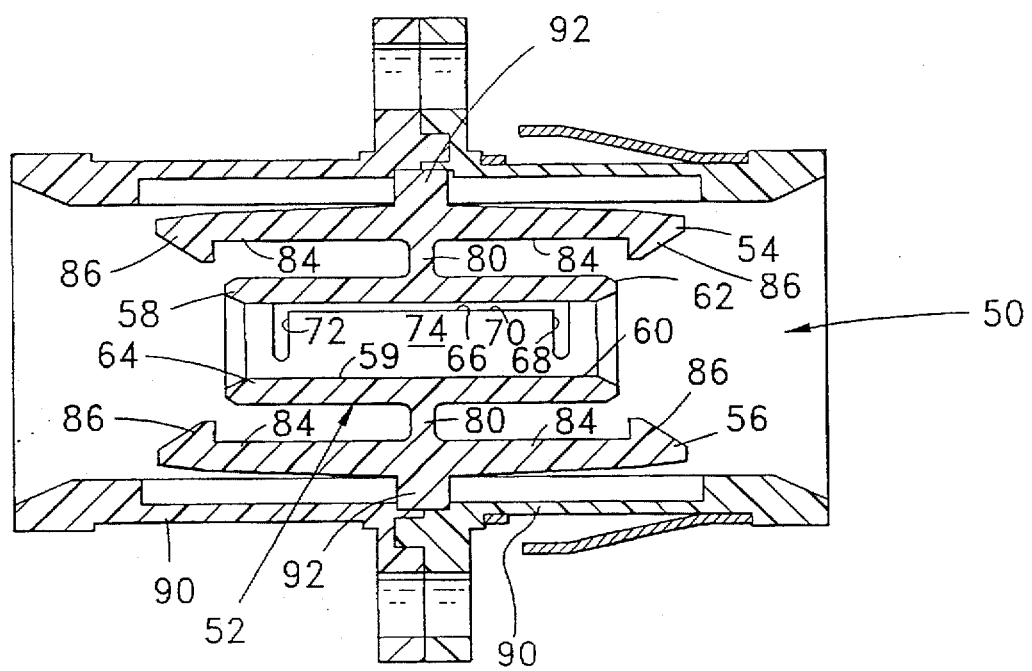
FIG. 6 is a longitudinal cross-section of the coupler of FIG. 3 shown within an outer housing.

As discussed above in the Background of the Invention, FIG. 1 illustrates a prior art SC coupler from U.S. Pat. No. 5,359,688 to Underwood. The conventional SC coupler is similar to the coupler of FIG. 1 but without metal clips 34. Inner halves 22 and outer halves 32 are of standard configuration to receive standard SC connectors. FIG. 2 illustrates standard SC connectors 12 disposed for insertion into the SC coupler of FIG. 1.

With reference to FIGS. 3–6, the preferred embodiment of coupler 50 of the present invention is shown. Coupler 50 preferably has the same overall outer dimensions of height, width and length as two inner halves 22 of FIG. 1 bonded together so that coupler 50 can be used with conventional SC connectors 12. Coupler 50 is preferably made of plastic and is monolithic with ferrule sleeve portion 52, top latch portion 54, and bottom latch portion 56.

Sleeve portion 52 has generally sleeve-shaped wall 58 with interior 59 that defines passageway 60 extending from first end 62 to second end 64 of sleeve portion 52. Sleeve portion 52 also defines cut-outs 66 that extend through wall 58 and have first circumferential length 68 that turns into longitudinal length 70 that turns into second circumferential length 72 so as to create flexible flaps 74. Flaps 74 have flats 75 extending along the inside top of the flaps 74 to contact the outer surface of a ferrule and press the ferrule toward the bottom of passageway 60. First and second circumferential lengths 68, 72 are spaced from first and second ends 62, 64, respectively. Sleeve portion 52 is made such that 60, the ferrule flexes the flexible flaps radially outward to provide a tight friction fit of the ferrule.

Figure 7:
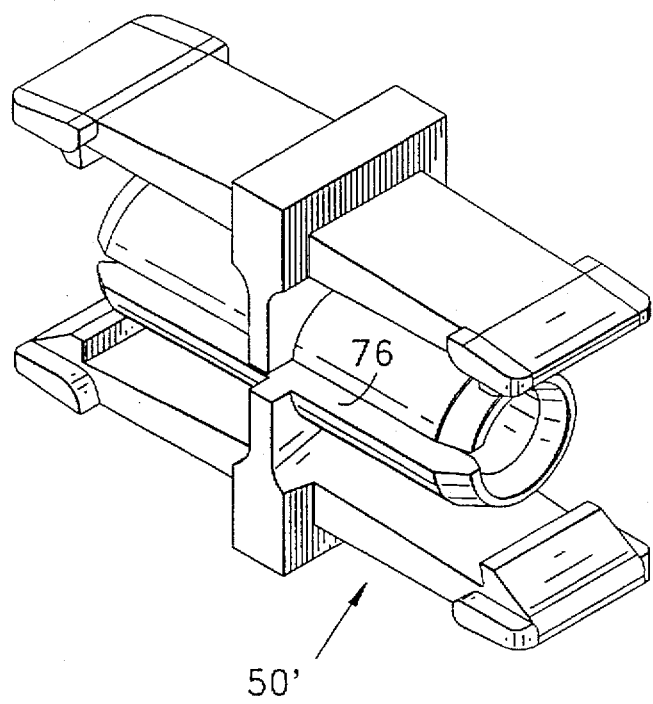
FIG. 7 is perspective view of an alternative embodiment of a coupler of the present invention.

It should be understood that sleeve portion 52 may have a variety of configurations as long as sleeve portion 52 can receive and align two ferrules. For example, FIG. 7 illustrates an alternative embodiment where sleeve portion 52' defines slot 76 that extends the entire length of sleeve portion 52'. Alternatively, flats 75 shown in FIG. 5 could be eliminated or changed to longitudinal concavities, convexities or another geometry as there are a variety of ways to insure proper retention and alignment of ferrules. Additionally, the sleeve shaped wall at sleeve portion 52 may be solid, that is, without any cut-outs or slots, as long as passageway 60 is sufficiently precise to align the ferrules without the need for flexibility in the sleeve portion. Preferably, however, at least a portion of the sleeve portion is flexible in a radially outward direction so as to be expandable radially outward when the ferrules are inserted into such portion of the sleeve portion.

Top and bottom latch portions 54, 56 extend parallel with sleeve portion 52 and are spaced from sleeve portion 52 by radial spacer portions 80 that extend radially between a mid point of sleeve portion 52 and a mid point of latch portions 54, 56. A midpoint can be any point between the ends. Each latch portion has two resilient latches 84 cantilevered opposite each other from one of the spacers 80 out over and parallel with sleeve portion 52. The configuration of each cantilevered latch is the same as the configuration of the latches 29, 30 shown in U.S. Pat. No. 5,359,688 which is incorporated herein by reference. Latches have downward projections 86 that are engageable with standard catches 30 of the standard connectors shown in FIG. 2.

Due to the preferred monolithic structure of coupler 50, coupler 50 by itself can engage the standard connector by latches 84 and receive and align ferrules in sleeve portion 52. In contrast, the conventional coupler of FIG. 1 requires a distinct ceramic sleeve to receive and align the ferrules and two distinct inner halves for engaging the connectors. In an alternative embodiment shown in FIG. 6, coupler 50 may be used in two outer halves 32 like those used as part of coupler 10 of FIG. 1. Coupler 50 has flanges 92 that extend outward to be captured by outer halves 32 when outer halves 32 are bonded together. Thus coupler 50 may be used either alone or with standard outer halves 32 to operatively mate two standard connectors.

While it is preferred that coupler 50 is monolithic, the coupler of the present invention may comprise a monolithic ferrule sleeve with the upper and lower latch portions attachable to the ferrule sleeve. In this way, all three portions are each one-piece in a longitudinal direction thereby resisting separation forces exerted by the ferrule spring mounts. It should be understood that while the drawings depict SC connectors and SC configurations, the present invention may also be adapted for use with ST® compatible connectors.

Although the present invention has been described with respect to a preferred embodiment and certain alternative embodiments, various changes, substitutions and modifications may be suggested to one skilled in the art and it is intended that the present invention encompass such changes, substitutions and modifications as fall within the scope of the following claims.

What is claimed is:

1. A monolithic coupler for coupling optical fiber connectors, each optical fiber connector having a ferrule extending from a connector housing, the coupler comprising:

(a) a sleeve portion having a generally sleeve-shaped wall with a first end and a second end opposite thereto, the wall defining a passageway extending there through in a longitudinal direction from the first end to the second end, the passageway sized for receiving and operatively aligning the ends of each of each of the ferrules in an end to end abutting relation at a point in the passageway, the sleeve portion further defines at least one cut-out through the wall so as to create at least one flexible flap in the wall that bears against the ferrules when the ferrules are disposed in the passageway of the sleeve portion;

(b) a first spacer portion and a second spacer portion extending from opposite sides of the sleeve portion at a midpoint along the sleeve portion and in a direction perpendicular to the longitudinal direction of the sleeve portion;

(c) a first latch portion extending in opposite directions from the first spacer portion so as to be spaced from and extending generally parallel with the sleeve portion, the first latch portion having a first end with a first projection and a second end opposite thereto with a second projection, the first and second projections engageable with the connector housings; and (d) a second latch portion extending in opposite directions from the second spacer portion so as to be spaced from and extending generally parallel with the sleeve portion, the second latch portion having a first end with a third projection and a second end opposite thereto with a fourth projection, the third and fourth projections engageable with the connector housings.

2. The coupler of claim 1 wherein at least a portion of the sleeve portion is flexible radially outward so as to be expandable radially outward when the ferrules are inserted in such portion of the sleeve portion.

3. The coupler of claim 2 wherein said first cut-out through the wall extends along a first circumferential length, a longitudinal length and then a second circumferential length so as to define said flexible flap in the wall, the first and second circumferential lengths spaced from the first and second ends of the sleeve portion, respectively, and wherein the cross-section of the passageway along the flexible flap is smaller than the cross-section of the passageway at the first end and second end of the sleeve portion.

4. The coupler of claim 3 wherein the sleeve portion further defines a second cut-out through the wall so as to create a second flexible flap in the wall, along which the cross-section of the passageway is reduced.

5. The coupler of claim 3 wherein the interior of the flexible flap has a flat extending along the length of the flexible flap for aligning the ferrule in the passageway.

6. The coupler of claim 2 wherein the sleeve portion defines a slot through the wall extending from the first end to the second end of the sleeve portion.

7. The coupler of claim 1 wherein the sleeve shaped wall is solid.

8. The coupler of claim 1 further comprising a first flange portion extending out from the first latch portion opposite the first spacer portion, and a second flange portion extending out from the second latch portion opposite the second spacer portion.

9. A coupler for connecting optical fiber connectors, each optical fiber connector having a ferrule disposed in a housing, the coupler comprising:

(a) a monolithic ferrule sleeve having an interior and an exterior, the interior configured for receiving and axially aligning the ends of each of the ferrules in an end to end abutting relation at a point in the interior of the ferrule sleeve, the monolithic ferrule sleeve defines at least one cut-out there through so as to create at least one flexible flap in the ferrule sleeve that bears against the ferrules when the ferrules are disposed in the ferrule sleeve;

(b) a first latch portion spaced from and extending substantially parallel with the ferrule sleeve, a midpoint of the first latch portion connected to a midpoint of the exterior of the ferrule sleeve;

(c) a second latch portion spaced from and extending substantially parallel with the ferrule sleeve, a midpoint of the second latch portion connected to a midpoint of the exterior of the ferrule sleeve; and (d) the first and second latch portions configured to be engageable with the connector housings.

10. The coupler of claim 9 wherein at least a portion of the ferrule sleeve is flexible radially outward so as to be expandable radially outward when the ferrules are inserted in such portion of the ferrule sleeve.

11. The coupler of claim 9 wherein the ferrule sleeve and the first and second latch portions are all cast as one piece.

12. The coupler of claim 9 wherein the ferrule sleeve is rigid in the radially outward direction.

* * * * *